US011388324B2

(12) United States Patent
Okuley

(10) Patent No.: US 11,388,324 B2
(45) Date of Patent: Jul. 12, 2022

(54) CAMERA DEVICE, BASE UNIT, COMPUTATION DEVICE, AND CORRESPONDING METHODS AND COMPUTER PROGRAMS

(71) Applicant: Intel Corporation, Santa Clara, CA (US)

(72) Inventor: James Okuley, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 37 days.

(21) Appl. No.: 16/901,071

(22) Filed: Jun. 15, 2020

(65) Prior Publication Data

US 2020/0314299 A1    Oct. 1, 2020

(51) Int. Cl.
*H04N 5/225* (2006.01)
*G06F 1/16* (2006.01)
*H04N 7/14* (2006.01)

(52) U.S. Cl.
CPC ......... *H04N 5/2257* (2013.01); *G06F 1/1607* (2013.01); *G06F 1/1632* (2013.01); *G06F 1/1686* (2013.01); *H04N 5/2253* (2013.01); *H04N 7/144* (2013.01)

(58) Field of Classification Search
CPC . H04N 2101/00; G06F 1/1607; G06F 1/1632; G06F 1/1686
See application file for complete search history.

(56) References Cited

U.S. PATENT DOCUMENTS

| | | | |
|---|---|---|---|
| 10,564,671 B1 * | 2/2020 | Romo | G06F 1/1632 |
| 10,623,695 B1 * | 4/2020 | Prasannavenkatesan | H04N 7/142 |
| 2003/0058363 A1 * | 3/2003 | Boyden | H04N 7/144 348/375 |
| 2004/0105024 A1 * | 6/2004 | Takahashi | H04N 1/00291 348/333.01 |
| 2008/0198264 A1 * | 8/2008 | Balram | H04N 21/440272 348/459 |
| 2018/0041733 A1 * | 2/2018 | Saptharishi | H04N 5/23296 |
| 2018/0146471 A1 | 5/2018 | Xu | |

FOREIGN PATENT DOCUMENTS

| | | | | |
|---|---|---|---|---|
| CN | 109936733 A | * | 6/2019 | |
| WO | WO-2007061678 A2 | * | 5/2007 | H04N 7/144 |

OTHER PUBLICATIONS

Bogdan Kreczmer, Fast Triangulation Method for an Ultrasonic Sonar System, 42 IFAC Proceedings vols. 13, p. 575-580 (2009), available at https://doi.org/10.3182/20090819-3-PL-3002.00100.

(Continued)

*Primary Examiner* — Paul M Berardesca
(74) *Attorney, Agent, or Firm* — 2SPL Patent Attorneys PartG mbB; Kieran O'Leary

(57) ABSTRACT

Examples relate to a camera device, to a base unit for a camera device, to a computation device, and to corresponding methods and computer programs. A camera device comprises a magnetic attachment mechanism for attaching the camera device to a display surface of a monitor. The camera device comprises a camera sensor for generating image data. The camera device comprises wireless communication circuitry for providing the image data wirelessly to a computation device.

13 Claims, 12 Drawing Sheets

(56) References Cited

OTHER PUBLICATIONS

Andrew Liszewski, OhGizmo! Review—EPOS Digital Pen & USB Flash Drive (Mar. 28, 2008), https://www.ohgizmo.com/ohgizmo-review-epos-digital-pen-usb-flash-drive/.
Boxlight, Inc., MimioTeach Portable Interactive Whiteboard (2019) available at https://global.boxlight.com/wp-content/uploads/2019/01/EMEA_MimioTeach.pdf.

* cited by examiner

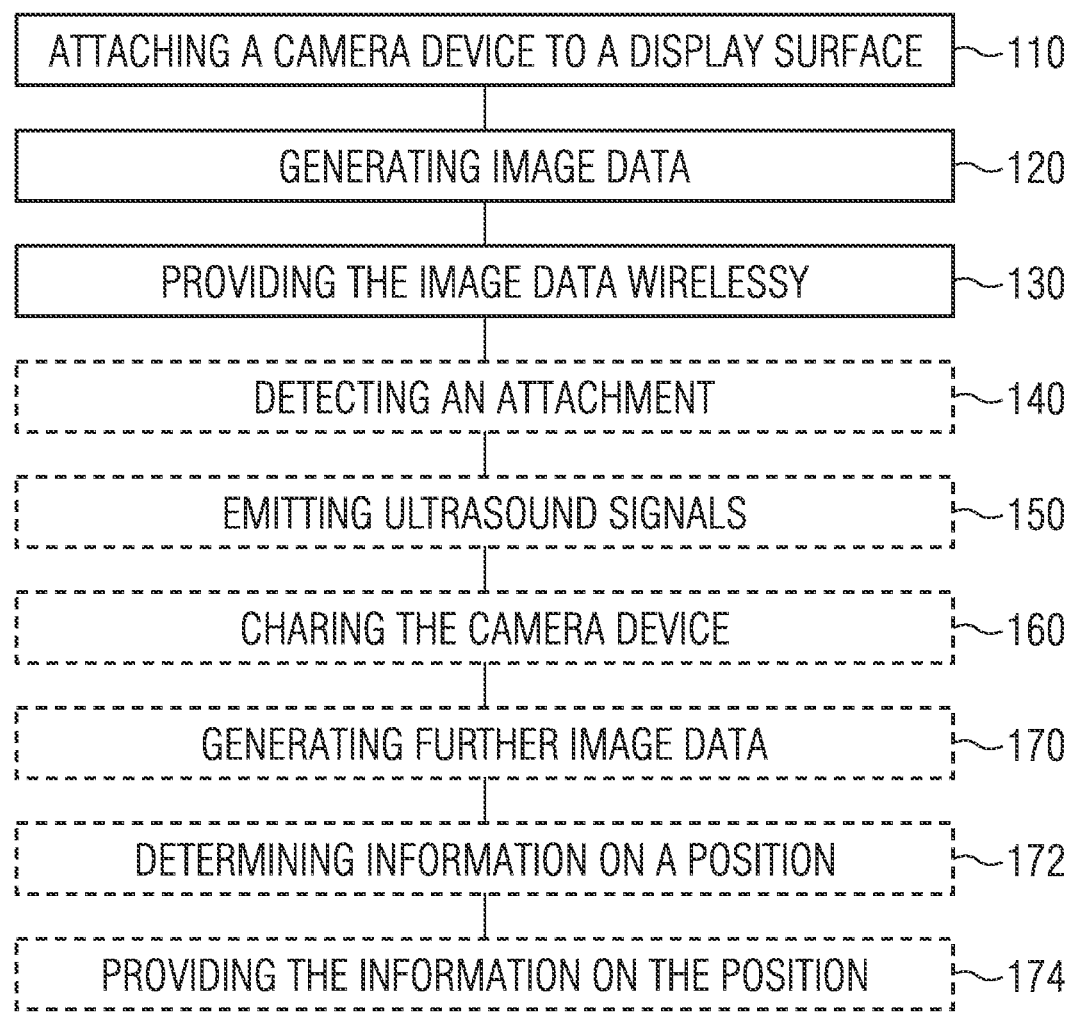

CAMERA DEVICE, BASE UNIT, COMPUTATION DEVICE, AND CORRESPONDING METHODS AND COMPUTER PROGRAMS

FIELD

Examples relate to a camera device, to a base unit for a camera device, to a computation device, and to corresponding methods and computer programs

BACKGROUND

Large displays having a diagonal of 27 inches or more are becoming commonplace for computers being used in the workplace, e.g. as external monitors that are being used together with a laptop computers. One consideration when using such large monitors is the placement of a webcam for use in video collaboration applications, in order to enable a natural user experience. A webcam being placed on top of a tall monitor captures the top of a user's head, a placement under the monitor results in poor views of the user. Also, eye contact might not be possible with these current placements of the web cam. Additionally, monitors that rotate to support both landscape and portrait display modes might not have good camera placement for optimal eye contact when collaborating over video.

In some implementations, software is used to redraw the user's eyes to simulate eye contact, which may look unnatural and which might not help with the suboptimal camera perspective.

BRIEF DESCRIPTION OF THE FIGURES

Some examples of apparatuses and/or methods will be described in the following by way of example only, and with reference to the accompanying figures, in which

FIG. 1c shows a flow chart of an example of a method for a camera device;

DETAILED DESCRIPTION

Figure 1A:
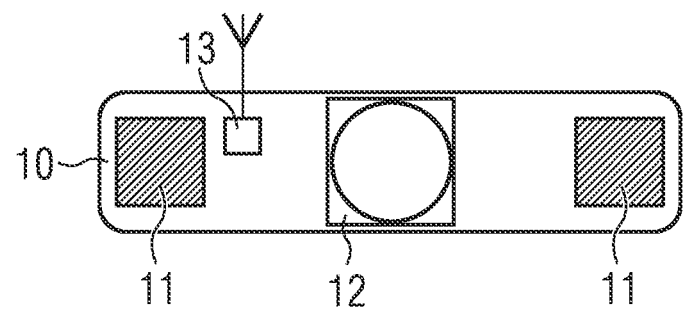
FIGS. 1a and 1b show schematic diagrams of examples of a camera device.

Some examples are now described in more detail with reference to the enclosed figures. However, other possible examples are not limited to the features of these examples described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Figure 1B:
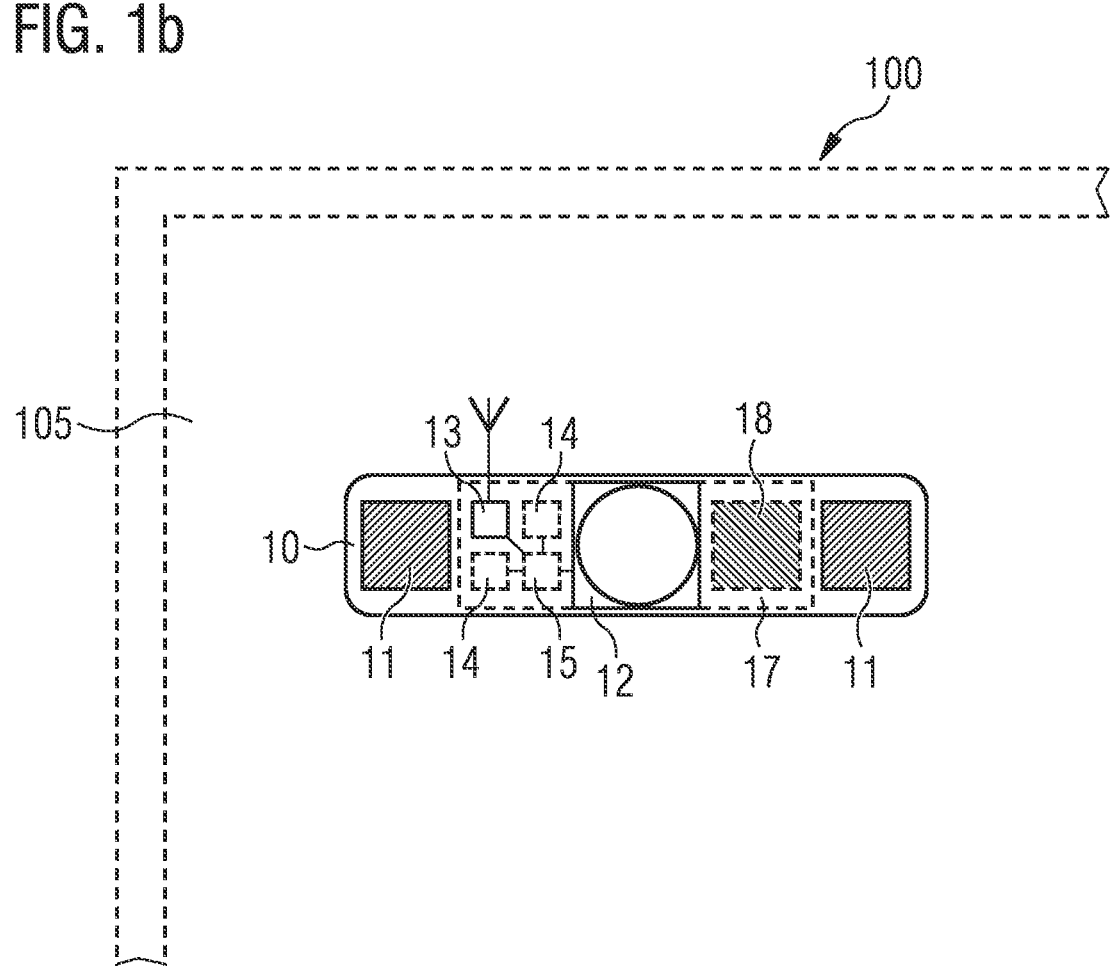

FIGS. 1a and 1b show schematic diagrams of examples of a camera device 10. In the following, the camera device is introduced with reference to certain structural components that may be used to implement the camera device. The camera device may, on the other hand, also be implemented using other components. Therefore, the camera device is not only introduced in terms of structural components, but also in terms of functional component means, which may be implemented by the respective structural components of the camera device. Therefore, the respective component means are introduced in parentheses. The camera device comprises a magnetic attachment mechanism (or magnetic attachment means) 11 for attaching the camera device to a display surface 105 of a monitor 100. The camera device comprises a camera sensor (or means for generating image data) 12 for generating image data. The camera device comprises wireless communication circuitry (or means for communicating wirelessly) 13 for providing the image data wirelessly to a computation device.

FIG. 1c shows a flow chart of an example of a corresponding method for a camera device. The method is performed by the camera device. The method comprises providing 110 a magnetic attachment mechanism for attaching the camera device to a display surface of a monitor. The method comprises generating 120 image data using a camera sensor of the camera device. The method comprises providing 130 the image data wirelessly to a computation device.

The following description relates to both the camera device and to the corresponding method for the camera device.

Various examples of the present disclosure relate to a camera device, and to a corresponding method and computer program (where applicable). Various examples of the present disclosure are based on the insight that large monitors having diagonals of 27 inches and more and/or monitors that support a portrait orientation are being used for working in the workplace or from home. At the same time, video conferencing is being widely used, e.g. in work-from-home scenarios. With large monitors, a placement of a camera to use for video conferencing may become harder, as placing a camera on top of the monitor may result in a view from the top, which might not allow for direct eye contact, and placing a camera below the monitor may result in an unfavorable "nostril view" from below. Various examples of the present disclosure provide a camera device that is suitable for providing direct eye contact in a video conferencing setting even with large monitors, by making the camera device attachable to the monitor. The camera may comprise silicone feet for avoiding scratches. For example, the camera device may be a wireless webcam, which may be used for video conferencing applications, and placed at an ergonomic height on a display surface of the monitor.

The camera device 10 comprises the magnetic attachment mechanism 11 for attaching the camera device to a display surface 105 of a monitor 100. In general, many desktop monitors comprise a steel backplate that provides rigidity to the monitor. For example, the monitor 100 may a desktop monitor. A camera device that comprises a magnetic attachment mechanism (with strong magnets) can be placed on the display surface, and the magnetic force may suffice for keeping the camera device in place on the display surface of the monitor. Consequently, the magnetic attachment mechanism 11 may comprise one or more magnets, e.g. permanent magnets, that are suitable for holding the camera device in place when the camera device is attached to the display surface via the magnetic attachment mechanism. For example, the magnetic attachment mechanism may be suitable for, or configured to, providing/provide a non-permanent (i.e. removable) attachment of the camera device to the display surface of the monitor (through a magnetic force being applied between the magnetic attachment mechanism and a steel backplate of the monitor). For example, the display surface of the monitor may be a portion of a surface of the monitor that a video signal being displayed by the monitor is shown on. In other words, the display surface of the monitor may exclude the frame or bezel of the monitor.

The camera device 10 comprises a camera sensor 12 for generating image data. For example, the camera sensor may be or comprise a world-facing camera sensor. For example, the camera sensor may be suitable for, or configured to, providing/provide image data for use in a video (collaboration) application. In some examples, as shown in the following, the camera device 10 may comprise a further camera sensor (also denoted 12, as it may be colocated with the camera sensor) that faces the display surface, i.e. a display-facing camera sensor.

The camera device comprises the wireless communication circuitry 13 that is suitable for, or configured to, providing/provide the image data wirelessly to the computation device. In general, the components of the camera device may be controlled by control circuitry 15 of the camera device. In other words, the camera device may comprise control circuitry (or means for controlling) 15. The control circuitry may be configured to control the components of the camera device, e.g. the camera sensor, the (optional) further camera sensor, the wireless communication device, a charging mechanism 18 and/or an ultrasound emitter 14. For example, the control circuitry may be configured to provide the image data wirelessly to the computation device via the wireless communication circuitry. In some examples, the image data is provided directly to the computation device. In other words, the control circuitry may be configured to provide the image data, using the wireless communication circuitry, directly to the computation device, e.g. without involving a base unit of the camera device. Alternatively, a base unit for the communication device, e.g. a base unit as introduced in connection with FIGS. 2a and/or 2b, may be involved. In other words, the control circuitry 15 may be configured to provide the image data to the computation device via a base unit of the camera device, e.g. by wirelessly providing the image data to the base unit, which may relay the image data to the computation device (e.g. wirelessly or using a wireline connection).

Apart from relaying the image data, the base unit may provide a home or dock for the camera device. For example, the camera device may be charged when the camera device is put into or onto the base unit. For example, the camera device may comprise a battery 17 (e.g. a lithium-ion battery or any suitable kind of battery) and a charging mechanism (or means for charging) 18 for charging 160 the camera device when the camera device is placed on a corresponding base unit 20. For example, the charging mechanism may comprise a wireless charging pad (for inductive charging) or contact pins for establishing an electrical connection with the base unit. Additionally, the charging mechanism may optionally comprise charging control circuitry for controlling the charging of the battery.

In many examples, the base unit is used to hold the camera device while the camera device is not in use, e.g. to recharge the camera, and to remove the camera device from the display surface so non-videoconferencing apps can use the entire display surface. Consequently, the base unit may comprise a mechanism for holding, i.e. retaining, the camera device when the camera device is put on (or in) the base unit. In the following, the term "on" is used, even when the camera device is inserted into a mechanism of the base unit. For example, the magnetic attachment mechanism may be used, in connection with one or more metal portions of the base unit, to retain the camera device. Alternatively, a form-fitting or force-fitting mechanism may be used to retain the camera device on (in) the base unit. For example, a shape of the camera device may be form-fit to a shape of a corresponding base unit for the camera device.

To provide an improved user experience, and to avoid the camera device getting into the way of the user, the camera device may be visually integrated with an application window being shown on the display surface. For example, the camera device may be manually placed on a corresponding spot within window of the video (conferencing) application by the user. Alternatively, the position of the camera device (e.g. relative to the display surface) may be determined, and the window of the video (conferencing) application may be adjusted accordingly. For this, the camera device may comprise an ultrasound emitter and/or an infrared emitter, or the further camera sensor may be used to determine the position of the camera device. For example, the camera device may comprise an ultrasound emitter (or means for emitting ultrasound signals) 14 configured to emit 150 ultrasound signals at least towards a base unit for the camera device. The base unit may comprise ultrasound sensors for sensing the ultrasound signals, and use these signals to triangulate the position of the camera device. For example, the ultrasound signals may be omnidirectional signals, so the base unit can be placed on any side of the monitor.=

In some examples, the positioning may be triggered by an attachment of the camera device at the display surface. For example, if the camera device is attached or re-attached to the display surface, or the position on the display surface is changed, the positioning may be started, e.g. by triggering the emission of the ultrasound signals. For example, the control circuitry may be configured to detect 140 an attachment (or re-attachment or movement) of the camera device to (or on) the display surface of the monitor. The control circuitry may be configured to trigger the positioning of the camera device, e.g. by controlling the ultrasound emitter to emit the ultrasound signals in response to the detection of the attachment. For example, the control circuitry may be configured to detect the attachment using an accelerometer 16 of the camera device. For example, the accelerometer may be used to detect a movement, and therefore a likely attachment or re-attachment, of the camera device.

As mentioned above, instead of an ultrasound or infrared triangulation, the further camera sensor may be used to determine the position of the camera sensor. For example, the further camera sensor may be used (i.e. configured to) to record a portion of the display surface, which may contain information that can be used to determine the position of the image (e.g. a coded coordinate system being displayed on the display surface). This information may be used by the camera device, or by the computation device, to determine the position of the camera. In other words, the camera device may comprise the further camera sensor (or the further means for generating image data) 12 that is suitable for generating 170 further image data of the display surface. The control circuitry may be configured to determine 172 information on a position of the camera device relative to the display surface based on the further image data. For example, the further image data may comprise a portion of a coded coordinate system being displayed on the display surface, and the control circuitry may be configured to determine the position of the camera device relative to the display surface based on the portion of the coded coordinate system. Alternatively, the further image data comprising the portion of the coded coordinate system may be the information on the position of the camera device, to be decoded by the computation device. The control circuitry may be configured to provide 174 the information on the position of the camera device to the computation device.

In general, the camera sensor or means for generating image data 12 may comprise an APS (Active Pixel Sensor)- or a CCD (Charge-Coupled-Device)-based imaging sensor. For example, in APS-based imaging sensors, light is recorded at each pixel using a photodetector and an active amplifier of the pixel. APS-based imaging sensors are often based on CMOS (Complementary Metal-Oxide-Semiconductor) technology. In CCD-based imaging sensors, incoming photons are converted into electron charges at a semiconductor-oxide interface, which are subsequently moved between capacitive bins in the imaging sensor modules by a control circuitry of the sensor imaging module to perform the imaging.

In examples the control circuitry or means for controlling 15 may be implemented using one or more processing units, one or more processing devices, any means for processing, such as a processor, a computer or a programmable hardware component being operable with accordingly adapted software. In other words, the described function of the control circuitry or means for controlling 15 may as well be implemented in software, which is then executed on one or more programmable hardware components. Such hardware components may comprise a general-purpose processor, a Digital Signal Processor (DSP), a micro-controller, etc.

The wireless communication circuitry or means for communicating wirelessly 13 may be implemented as any means for transceiving, i.e. receiving and/or transmitting etc., one or more transceiver units, one or more transceiver devices and it may comprise typical receiver and/or transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, etc. For example, the wireless communication circuitry or means for communicating wirelessly 13 may be configured to communicating via a wireless communication system, e.g. via a wireless communication system operating in the 2.4 GHz or 5 GHz frequency range, such as wireless local area network (WLAN, also denoted WiFi), Bluetooth or any other wireless communication system.

More details and aspects of the camera device and the corresponding method are mentioned in connection with the proposed concept or one or more examples described above or below (e.g. FIGS. 2a to 10c). The camera device and the corresponding method may comprise one or more additional optional features corresponding to one or more aspects of the proposed concept or one or more examples described above or below.

Figure 2A:
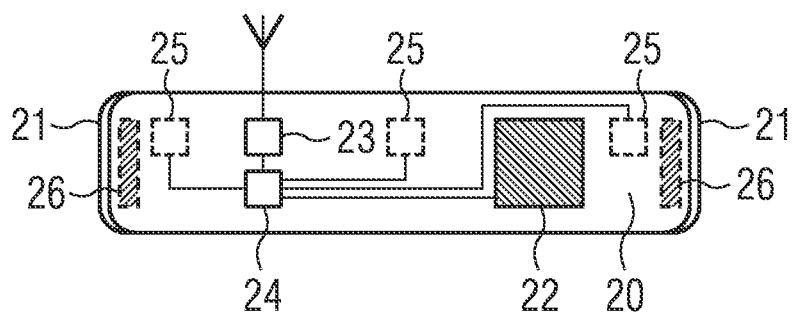
FIG. 2a shows a schematic diagram of an example of a base unit for a camera device.

FIG. 2a shows a schematic diagram of an example of a base unit 20 for a camera device 10. In the following, the base unit is introduced with reference to certain structural components that may be used to implement the base unit. The base unit may, on the other hand, also be implemented using other components. Therefore, the base unit is not only introduced in terms of structural components, but also in terms of functional component means, which may be implemented by the respective structural components of the base unit. Therefore, the respective component means are introduced in parentheses. The base unit 20 comprises a structural component (or structural means) 21 for removably holding the camera device. The base unit 20 comprises a charging mechanism (or charging means) 22 for charging the camera device when the camera device is held by the structural component. The base unit 20 comprises wireless communication circuitry (or means for communicating wirelessly) 23 for wirelessly communicating with the camera device. The base unit 20 comprises control circuitry (or means for controlling) 24 configured to receive image data from the camera device via the wireless communication circuitry, and to provide (i.e. relay) the image data to a computation device 30 via interface circuitry of the base unit.

Figure 2B:
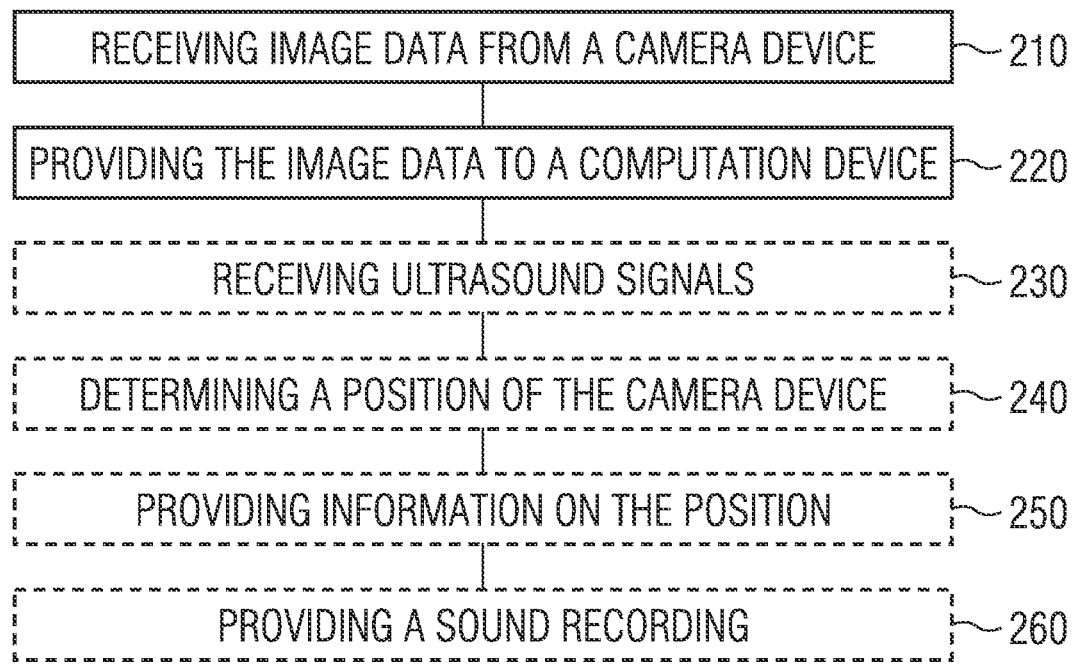
FIG. 2b shows a flow chart of an example of a method for a base unit for a camera device.

FIG. 2b shows a flow chart of an example of a corresponding method for a base unit for a camera device. The method is performed by the base unit 20. The method comprises receiving 210 image data from the camera device via a wireless communication. The method comprises providing 220 (i.e. relaying) the image data to a computation device.

The following description relates both to the base unit and to the corresponding method for the base unit.

While the examples shown in connection with FIGS. 1*a* to 1*c* relate to the camera device, the examples shown in connection with FIGS. 2*a* and/or 2*b* relate to the corresponding base unit for the camera device. For example, the base unit may be a dock for the camera device, i.e. a dock for holding the camera device while the camera device is not in use (or at least not attached to the display surface of the monitor). The base unit may be used for recharging the camera device, and, optionally, for determining the position of the camera device.

The base unit comprises a structural component 21 for removably holding the camera device. For example, the base unit may comprise one or more metal plates (e.g. one or more steel plates). In other words, the structural component may correspond to or comprise one or more metal plates. The one or more metal plates may be used, in connection with the magnetic attachment mechanism 11 of the camera device, to removably hold the camera device on (or in) the base unit. Alternatively or additionally, the structural component may be shaped to retain the camera device, e.g. using a form-fit or force-fit mechanism. For example, the structural component may be form-fit for holding the camera device. In some examples, the structural component 21 supports more than one orientation of the camera device. For example, the structural component 21 may be configured such, that the camera device is held in a first orientation and in a second orientation. For example, in the first orientation, the camera device may be held such, that the camera sensor of the camera device is pointing towards a user of the monitor (when the base unit is attached to the monitor). In the second orientation, the camera device may be held such, that the camera sensor of the camera device is pointing away from the user of the monitor.

In various examples, the base unit may be attachable to the frame of the monitor. For example, the base unit may comprise an attachment mechanism (or means for attaching) 26 for attaching the base unit to the frame or stand of the monitor. In some examples, the attachment mechanism may be a magnetic attachment mechanism. In some other cases, the attachment mechanism may comprise an adhesive.

In some examples, the computation device is a laptop computer. The base unit may be integrated within a frame of a monitor of the laptop computer. For example, the base unit may comprise a first portion that is integrated within the frame of the monitor, and a second portion that is removable from the frame of the monitor of the computation device and that can be attached to the frame of the monitor the camera device is attached to. When both portions of the base unit are attached to the monitor of the computation device and the camera device is held by the base unit, the camera device can be used as a webcam of the computation device in portable use.

The base unit comprises the charging mechanism 22 for charging the camera device when the camera device is held by the structural component. As mentioned in connection with FIGS. 1*a* to 1*c*, the camera device can be charged using wireless (induction-based) charging, or charging via one or more contact pads. Accordingly, the charging mechanism 22 may comprise wireless charging pads, or one or more charging pins for charging the camera device. Additionally, the charging mechanism may comprise a charging control circuitry for controlling the charging of the camera device.

The base unit comprises the wireless communication circuitry (or means for communicating wirelessly) 23 for wirelessly communicating with the camera device. Accordingly, the control circuitry may be configured to wirelessly communicate with the camera device via the wireless communication circuitry. For example, the control circuitry 24 is configured to receive image data from the camera device via the wireless communication circuitry. The control circuitry may be further configured to exchange further control information with the camera device via the wireless control circuitry. For example, the base unit may be configured to transmit a trigger for starting a positioning process to the camera device using the wireless communication circuitry, or to receive a corresponding trigger from the camera device. The control circuitry is configured to provide the image data to the computation device 30 via interface circuitry of the base unit. For example, the control circuitry may be configured to provide the image data to the computation device via the wireless communication circuitry, e.g. if the base unit is coupled with the computation device using a wireless communication network. Alternatively, the interface circuitry may be separate from the wireless communication circuitry. For example, the interface circuitry may be interface circuitry for providing a wireline connection according to a universal serial bus (USB) protocol.

As has been mentioned before, the base unit may be used to determine the position of the camera device, e.g. via ultrasound or via infrared. For example, the base unit may comprise two or more ultrasound sensors (or means for sensing ultrasound) 25 for receiving 230 ultrasound signals from the camera device. The control circuitry may be configured to determine 240 a position of the camera device relative to the base unit based on the received ultrasound signals. For example, the control circuitry may be configured to triangulate (or trilateration) the position of the camera device based on the received ultrasound signals, e.g. based on a time-delay/phase-difference and/or based on a difference in amplitude between the signals being received over the two or more ultrasound sensors. Alternatively or additionally, the base unit may comprise a camera sensor for receiving infrared signals from the camera device. The control circuitry may be configured to determine the position based on the received infrared signals. Alternatively or additionally, the control circuitry may be configured to use the camera sensor to determine the position of the camera device based on a position and size of the camera device within a line of sight of the camera sensor. The control circuitry may be configured to provide 250 information on the position of the camera device to the computation device via the interface circuitry.

In some examples, the unit is arranged at a known position relative to the display surface 105 of the monitor 100. For example, the base unit may be integrated into a frame of the monitor, or the base unit may be attached to the frame of the monitor, and the position of the unit relative to the display surface may be known to calibration of the position relative to the display surface, e.g. via a software being executed by the computation device. Accordingly, the position of the camera device relative to the display surface may be deduced from the position of the camera device relative to the base unit. Accordingly, the control circuitry may be configured to determine the position of the camera device relative to the display surface of the monitor (and provide the respective information to the computation device)

In various examples, the same sensors may be used for receiving the ultrasound signals and for recording sound from the user, e.g. sound to be used by the videoconferencing application. For example, the two or more ultrasound sensors may be two or more microphones, e.g. two or more microphones that are suitable for recording sound (e.g. in the 20 Hz to 20 000 Hz frequency range) and ultrasound (in the frequency range of 20 000 Hz and above) wherein the control circuitry is configured to provide 260 a sound recording recorded via the two or more microphones to the computation device via the interface circuitry, e.g. together with the image data and/or synchronized to the image data.

The interface circuitry or means for communicating may correspond to one or more inputs and/or outputs for receiving and/or transmitting information, which may be in digital (bit) values according to a specified code, within a module, between modules or between modules of different entities. For example, the interface circuitry or means for communicating may comprise interface circuitry configured to receive and/or transmit information.

In examples the control circuitry or means for controlling 24 may be implemented using one or more processing units, one or more processing devices, any means for processing, such as a processor, a computer or a programmable hardware component being operable with accordingly adapted software. In other words, the described function of the control circuitry or means for controlling 24 may as well be implemented in software, which is then executed on one or more programmable hardware components. Such hardware components may comprise a general-purpose processor, a Digital Signal Processor (DSP), a micro-controller, etc.

The wireless communication circuitry or means for communicating wirelessly 23 may be implemented as any means for transceiving, i.e. receiving and/or transmitting etc., one or more transceiver units, one or more transceiver devices and it may comprise typical receiver and/or transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, etc. For example, the wireless communication circuitry or means for communicating wirelessly 23 may be configured to communicating via a wireless communication system, e.g. via a wireless communication system operating in the 2.4 GHz or 5 GHz frequency range, such as wireless local area network (WLAN, also denoted WiFi), Bluetooth or any other wireless communication system.

More details and aspects of the base unit and the corresponding method are mentioned in connection with the proposed concept or one or more examples described above or below (e.g. FIG. 1a to 1c, 3a to 10c). The base unit and the corresponding method may comprise one or more additional optional features corresponding to one or more aspects of the proposed concept or one or more examples described above or below.

Figure 3A:
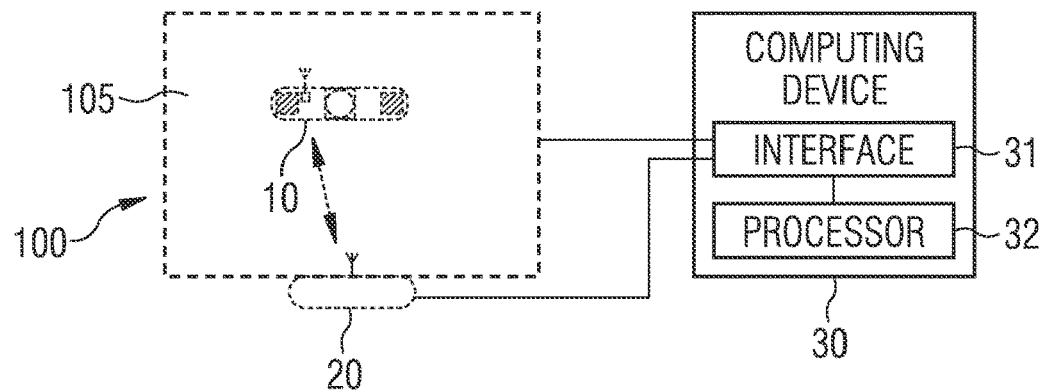
FIGS. 3a and 3b show a schematic diagrams of examples of computation devices.
Figure 3B:
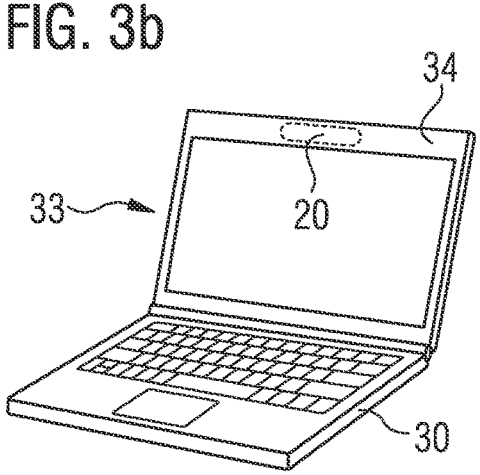

FIGS. 3a and 3b show a schematic diagrams of examples of computation devices; In the following, the computation device is introduced with reference to certain structural components that may be used to implement the computation device. The computation device may, on the other hand, also be implemented using other components. Therefore, the computation device is not only introduced in terms of structural components, but also in terms of functional component means, which may be implemented by the respective structural components of the computation device. Therefore, the respective component means are introduced in parentheses. The computation device 30 comprises interface circuitry (or means for communicating) 31 for communicating with a base unit 30 for a camera device 20 or with the camera device. The computation device 30 comprises one or more processors (or means for processing) 32 configured to obtain image data of the camera device. The one or more processors are configured to obtain information on a position of the camera device from the camera device or from the base unit. The one or more processors are configured to determine a position of a window of a video application on a display surface 105 of a monitor 100 based on the information on the position of the camera device. The video application uses the image data of the camera device.

FIGS. 3a and 3b further show a system comprising the camera device and the base unit, a system comprising the camera device and the computation device, and a system comprising the camera device, the computation device, and the base unit. FIG. 3b further shows a computation device comprising the base unit.

Figure 3C:
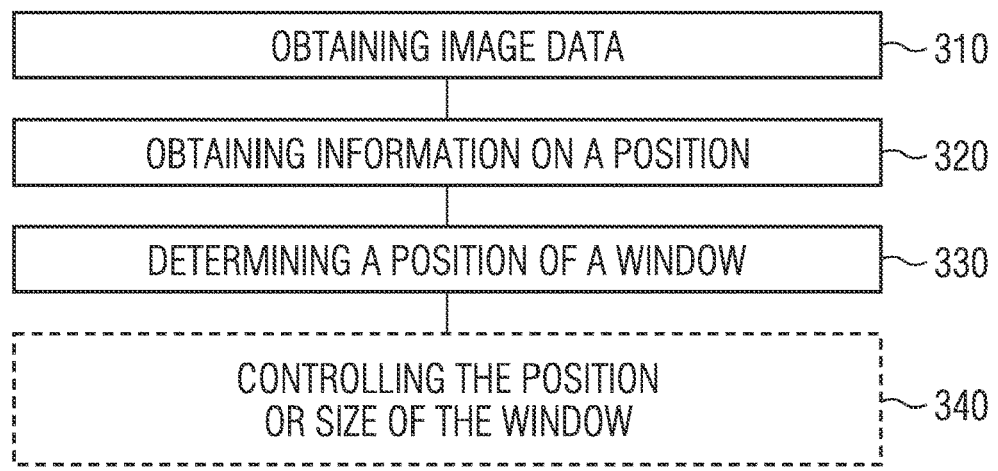
FIG. 3c shows a flow chart of a method for a computation device.

FIG. 3c shows a flow chart of a corresponding method for a computation device. The method comprises obtaining 310 image data of a camera device. The method comprises obtaining 320 information on a position of the camera device from the camera device or from a base unit for the camera device. The method comprises determining 330 a position of a window of a video application on a display surface of a monitor based on the information on the position of the camera device, the video application using the image data of the camera device.

The following description relates both to the computation device and to the corresponding method for the computation device.

Various examples of the present disclosure relate to a computation device and to a corresponding method for a computation device. As mentioned in connection with the camera device and the corresponding base unit, the computation device is the target of the image data that is generated by the camera device. Therefore, the computation device receives the image data from the camera device, either directly or via the base unit, and uses it in a video application, such as a video conferencing application. In other words, the one or more processors are configured to obtain the image data of the camera device, e.g. directly from the camera device, or via the base unit. For example, the image data may be a video stream that is generated by a camera sensor of the camera device, e.g. by a world-facing camera sensor of the camera device.

Similarly, the one or more processors are configured to obtain the information on the position of the camera device from the base unit or from the camera device. For example, the information on the position may indicate the position of the camera device relative to the base unit, e.g. if the information on the position is obtained from the base unit and the base unit is now aware of its position relative to the display surface of the monitor, e.g. in terms of mm relative to the base unit. Alternatively, the information on the position may indicate the position of the camera device relative to the display surface of the camera device, e.g. in terms of pixels or mm on a two-dimensional grid of pixels/mm. In some examples, the information on the position may comprise further image data of a display-facing camera sensor of the camera device. In this case, the one or more processers may be configured to determine the position of the camera device relative to the display surface of the monitor based on the further image data, e.g. by determining the position of the further image data within a coded coordinate system of which a portion is shown in the further image data.

In either case, both the image data and the information on the position may be obtained (i.e. received) from the same entity, i.e. either from or via the base unit, or directly from the camera device. In other words, the one or more processors may be configured to obtain the information on the position of the camera device from the base unit, and to obtain the image data of the camera device via the base unit (e.g. from the camera device, and relayed by the base unit). Alternatively, the one or more processors may be configured to obtain the information on the position of the camera device and the image data from the camera device.

If the image data and the information on the position is received (directly) from the camera device, the respective information may be received wirelessly. In other words, the interface circuitry may be interface circuitry for communicating wirelessly with the camera device. If the image data and the information is received from or via the base unit, the interface circuitry may be interface circuitry for communication wirelessly (e.g. via WiFi) or wireline (e.g. according to the USB protocol) with the base unit.

The one or more processors are configured to determine a position of a window of a video application on a display surface 105 of a monitor 100 based on the information on the position of the camera device. In particular, the one or more processors are configured to determine, where the window of the video application is to be drawn on the display surface relative to the camera device. Accordingly, the one or more processors may be configured to control 340, i.e. set, the position and/or a size of the window of the video application based on the information on the position of the camera device. Accordingly, the one or more processors may be configured to move and/or resize the window of the video application based on the information on the position of the camera device, e.g. such that the window is at a position that intersects with the position of the camera device, e.g. at a pre-defined portion of the user interface shown within the window. For example, the one or more processors may be configured to generate a so-called alignment window that intersects with the position of the camera device, and to move and/or resize the window of the video application such, that the window of the video application is shown at a pre-defined position relative to the alignment window, e.g. vertically underneath or overlapping with the alignment window. The video application uses the image data of the camera device. For example, the one or more processors may be configured to show the image data as part of the window of the video application. For example, the video application may be a video conferencing application, a video chat application, a video diary application, or a video application for recording video of the user (e.g. for a video portal).

In some examples, the one or more processors are configured to launch the video application after the camera device is attached to the display surface, e.g. triggered by the attachment of the camera device at the display surface. For example, the information on the position may trigger the launch of the video application. In other words, the one or more processors may be configured to launch the video application in response to receiving the information on the position from the camera device or from the base unit.

In general, the monitor 100 may be external to the computing device, e.g. a desktop monitor. In addition, the computing device may comprise an integrated monitor, e.g. if the computing device is a laptop computer or a tablet computer. In some cases, the monitor 100 may be the integrated monitor, e.g. if the computing device is an all-in-one computing device with a large-screen (e.g. at least 27 inches diagonal) monitor. As has been mentioned in connection with the base unit, the base unit may be either external to the computing device, or integrated into the computing device, e.g. removably integrated within the computing device. In other words, the base unit may be external to the computation device. Alternatively, the base unit is integrated within a frame 34, e.g. the top bezel, of a monitor 33 (or monitor) of the computing device/laptop computer. For example, the monitor the base unit is integrated in is the same monitor the video application is displayed on, e.g. if the computing device is an all-in-one computing device with a large monitor. Alternatively, the monitor the base unit is integrated in is different from the monitor the video application is displayed on, e.g. if the computing device is a laptop computer.

The interface circuitry or means for communicating 31 may correspond to one or more inputs and/or outputs for receiving and/or transmitting information, which may be in digital (bit) values according to a specified code, within a module, between modules or between modules of different entities. For example, the interface circuitry or means for communicating 31 may comprise interface circuitry configured to receive and/or transmit information. For example, the interface circuitry may be implemented as any means for transceiving, i.e. receiving and/or transmitting etc., one or more transceiver units, one or more transceiver devices and it may comprise typical receiver and/or transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, etc. For example, the interface circuitry may be configured to communicating via a wireless communication system, e.g. via a wireless communication system operating in the 2.4 GHz or 5 GHz frequency range, such as wireless local area network (WLAN, also denoted WiFi), Bluetooth or any other wireless communication system. Alternatively or additionally, the interface circuitry may be configured to communicate over a wireline connection, e.g. according to the USB protocol.

In examples the one or more processors or means for processing 32 may be implemented using one or more processing units, one or more processing devices, any means for processing, such as a processor, a computer or a programmable hardware component being operable with accordingly adapted software. In other words, the described function of the one or more processors or means for processing 32 may as well be implemented in software, which is then executed on one or more programmable hardware components. Such hardware components may comprise a general-purpose processor, a Digital Signal Processor (DSP), a micro-controller, etc.

More details and aspects of the computation device and the corresponding method are mentioned in connection with the proposed concept or one or more examples described above or below (e.g. FIG. 1a to 2b, 4a to 10c). The base unit and the corresponding method may comprise one or more additional optional features corresponding to one or more aspects of the proposed concept or one or more examples described above or below.

Various examples of the present disclosure relate to an automatic web cam application placement. A wireless web camera, i.e. a camera device, may be placed on the users monitor in any location that is suitable or optimal for capturing direct eye contact and a natural camera angle of the user. The software application window may automatically align with the placement of the physical camera on the display. Various examples may be used to provide direct eye contact and natural views of the end user, while giving flexibility for the end user to multitask with other application windows while using the video collaboration window in the location of their choosing. An automatic placement of the application may make it easy to use with no need to drag windows or manually align the application window.

Various examples of the present disclosure relate to a base unit and a wireless (e.g. WiFi) camera (e.g. the camera device). The base unit may provide charging of the wireless camera unit when not in use and may, in some examples, locate the position of the camera on the monitors surface when in use, e.g. via ultrasound signal triangulation.

In some examples, the base unit may be placed under the monitor. The user may attach the camera to any area of the monitor's screen (i.e. the display surface of the monitor). The camera unit (i.e. camera device) may magnetically attach to the display, as the vast majority of large desktop monitors have a steel structural plate as part of the LCD (Liquid Crystal Display) that the camera's magnets (of a magnetic attachment mechanism) can adhere to. Once the camera location is identified via the base unit, an application running on the PC (Personal Computer, a computing device) may launch a web chat application, such as Skype) and automatically align the application with the camera unit. For example, the top bar of the app may be centered on the camera (as shown in FIG. 4c, for example).

Figure 4A:
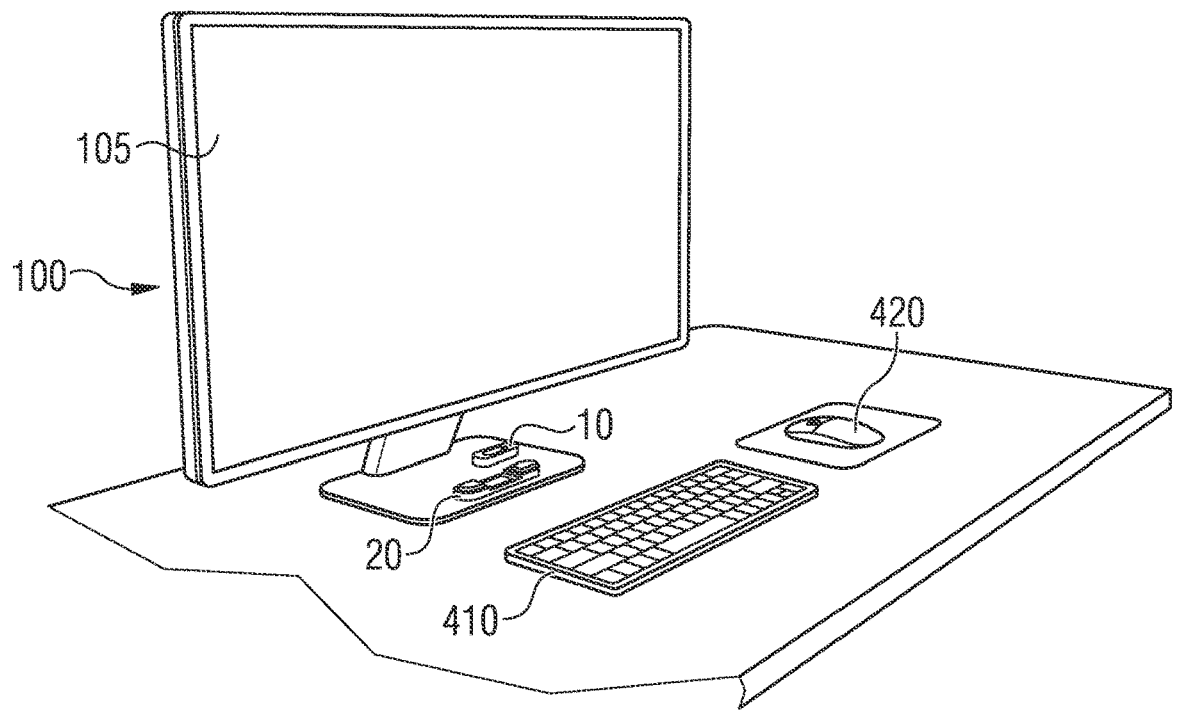
FIG. 4a illustrates a wireless camera unit being placed in a base unit under the monitor for charging.
Figure 4B:
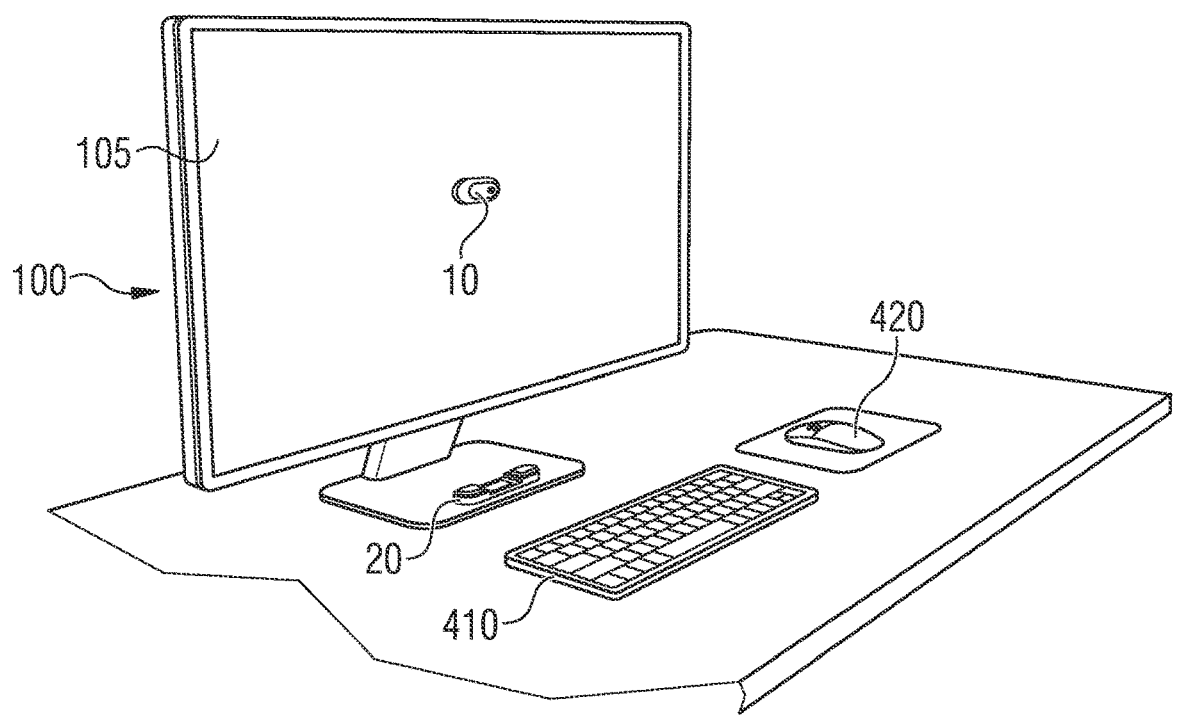
FIG. 4b illustrates a wireless camera unit being placed on the display in any location by the end user.
Figure 4C:
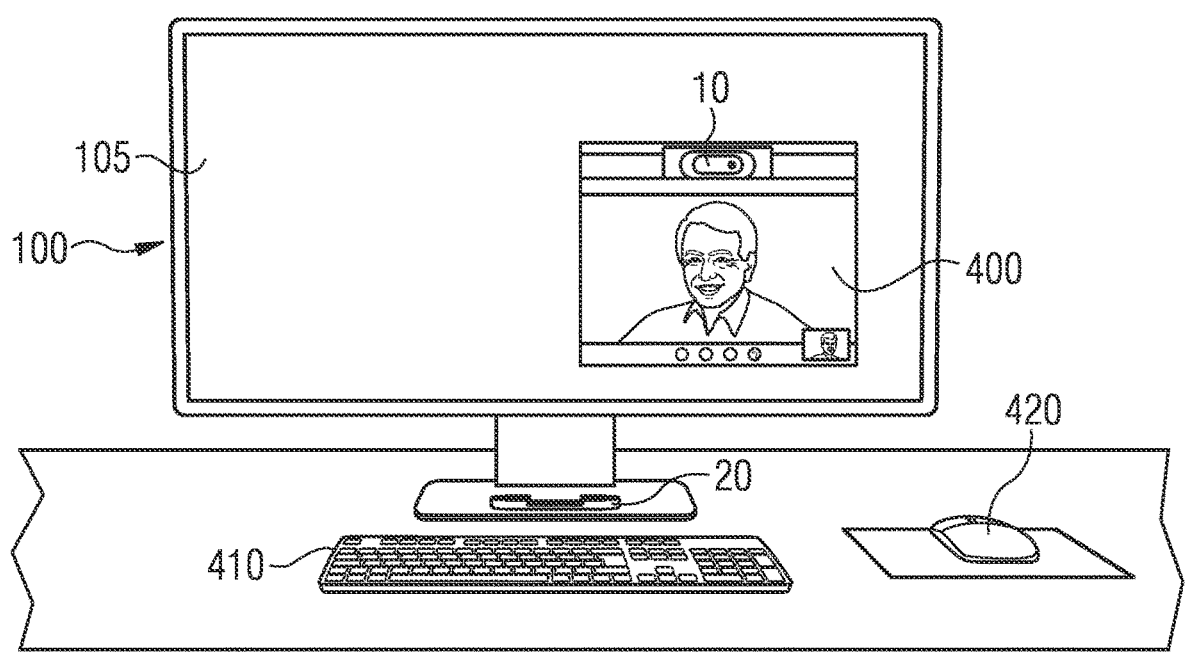
FIG. 4c illustrates a base triangulating a location of the camera, and launching and aligning a video chat application.

FIG. 4a illustrates a wireless camera unit (or camera device) 10 being placed in a base unit 20 under the monitor 100 for charging. FIG. 4 further shows a keyboard 410 and a mouse 420, which may be coupled to a computing device (not shown) that is coupled to the monitor. FIG. 4b illustrates the wireless camera unit 10 being placed on the display in any location by the end user. FIG. 4c illustrates a base triangulating a location of the camera 10, and (automatically) launching and aligning a video chat application 400. Such a concept may provide the user of the desktop PC with an improved or optimized user experience for video collaboration, so they choose to utilize the PC platform instead of their phone for video calls.

Figure 5C:
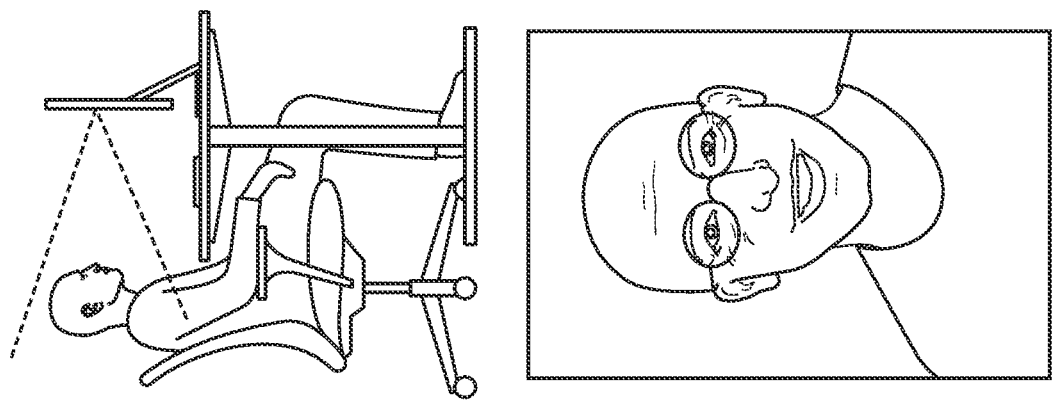
FIGS. 5a to 5c show schematic drawings of viewing angles provided from different camera angles.
Figure 5B:
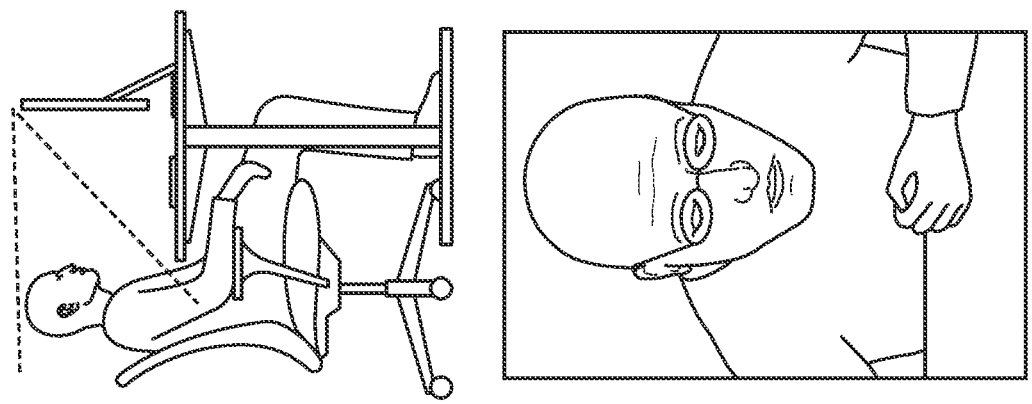
Figure 5A:
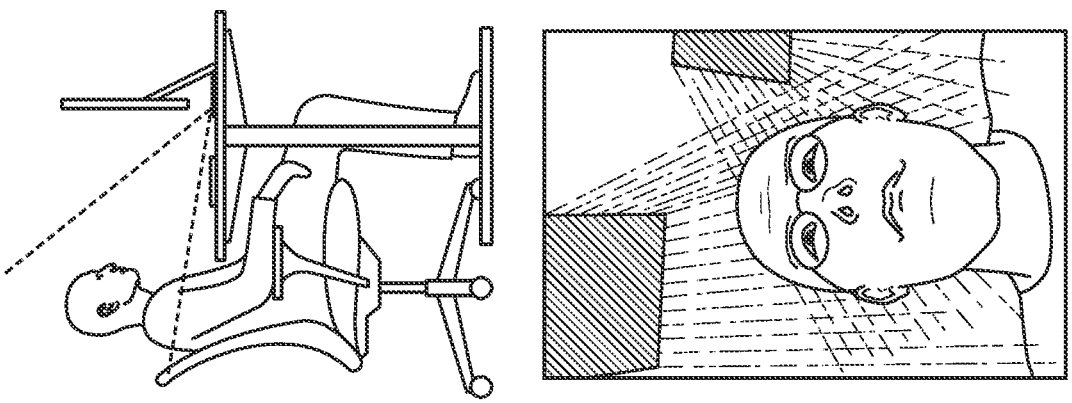

FIGS. 5a to 5c show schematic drawings of viewing angles provided from different camera angles. FIGS. 5a to 5c may show how to select an improved or best camera angle. In FIG. 5a, the camera is placed under the monitor, providing a chin/nostril view, with additional issues due to the ceiling lighting. In FIG. 5b, the camera is placed under monitor, providing a view of the top of the head, which also results in poor eye contact. In FIG. 5c, an improved or optimized camera placement is shown, resulting in a pro head show view with ideal eye contact. In FIG. 5c, the camera is approximately at the height of the eyes of the user.

Figure 6:
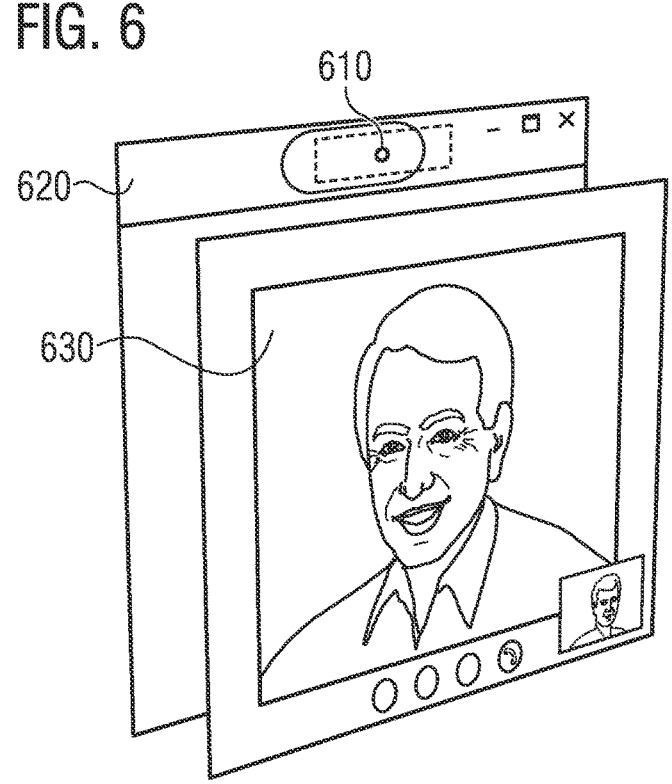
FIG. 6 shows a schematic illustration of two software layers being used for an alignment app and for a video collaboration app.

FIG. 6 shows a schematic illustration of two software layers being used for an alignment app and for a video collaboration app. In FIG. 6, two software layers 620 and 630 are shown, one (620) for the alignment app, and one (630) for the video collaboration app (Skype, Zoom, Duo etc.). The camera may be placed on position 610, i.e. the software layers may be moved such, that position 610 aligns with the position of the camera. One or more of the following software components may be used—an ultrasound triangulation software component (may also be provided by the base unit), a location window alignment application (which aligns the camera location 610 to the title bar (of the software layer 620), and which may cause a video collaboration application (such as Skype) to be auto-launched by the alignment application and also aligned to the title bar camera location. Furthermore, software components may manage wireless (e.g. WiFi) camera communication to the PC. Additionally or alternatively, one or more of the following hardware components may be used. The base unit may (optionally) comprise a microphone array for tracking location of the camera in relation to the calibrated display area (and for voice), a battery charger and contacts for charging the wireless camera unit, and a power cord. The camera unit may be a low power wireless (e.g. WiFi) camera. The camera unit may comprise an ultrasound emitter. The camera unit may comprise a strong magnet for magnetic attachment to the active display surface. The camera unit may comprise a silicone foot to protect the display. The camera unit may comprise a battery and charging contacts. The camera unit may comprise LED (Light Emitting Diode) indicators for status, battery, and, optionally, an IR LED for positioning. The camera unit may comprise a privacy lens cover).

Figure 7A:
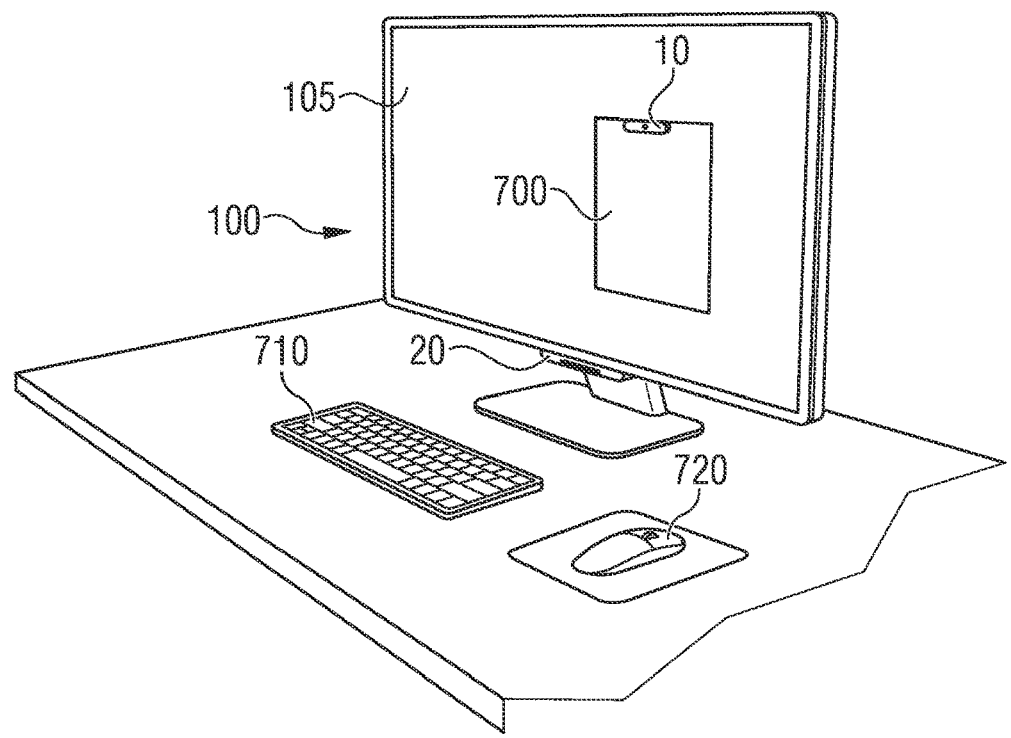
FIG. 7a shows a schematic diagram of a wireless camera unit being used on a monitor in landscape orientation.
Figure 7B:
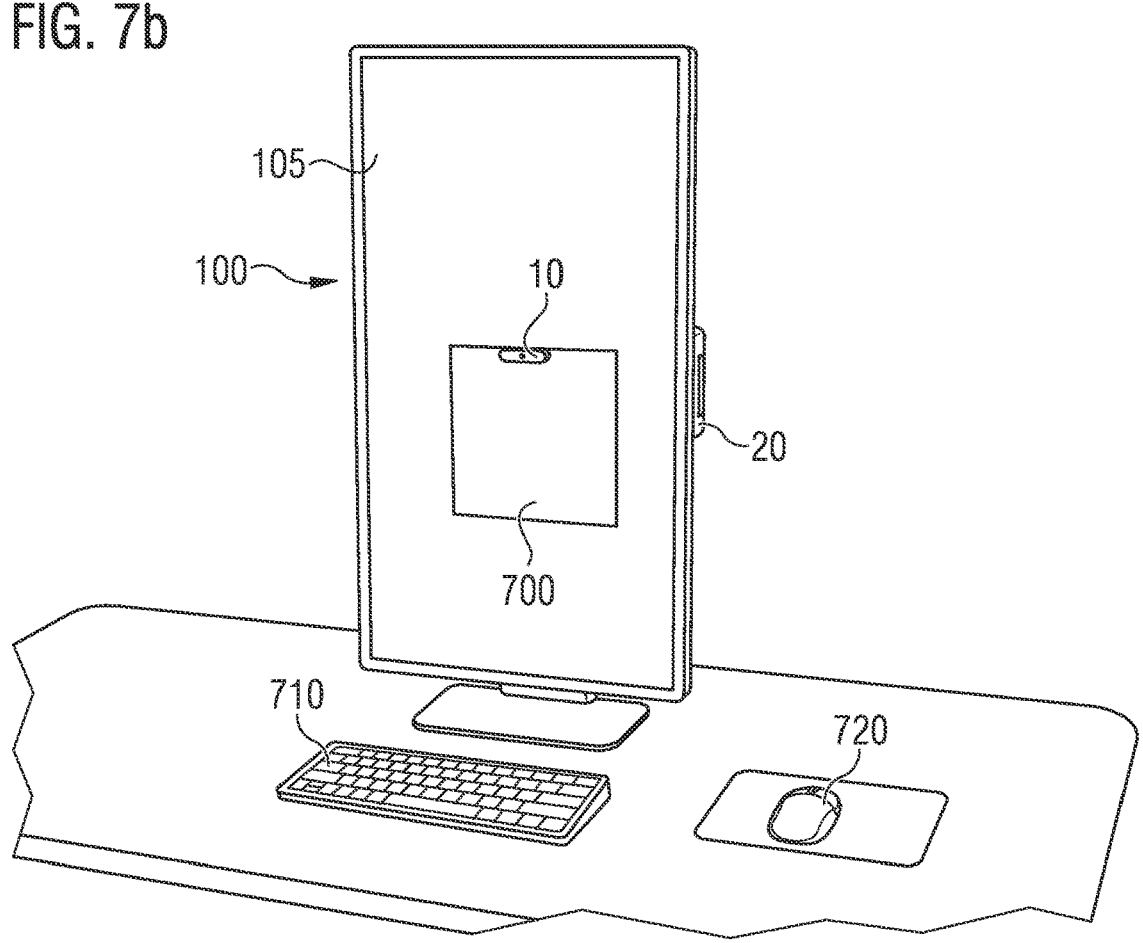
FIG. 7b shows a schematic diagram of a wireless camera unit being used on a monitor in portrait orientation.

FIG. 7a shows a schematic diagram of a wireless camera unit (camera device) 10 being used on a monitor 100 (with a display surface 105) in landscape orientation. FIG. 7b shows a schematic diagram of a wireless camera unit 10 being used on a monitor 100 in portrait orientation. In FIG. 7b, the monitor 100 has been rotated for portrait use. FIGS. 7a and 7b further show a base unit 20 for the wireless camera unit, a window of a video collaboration application 700 being shown on the display surface 105, a keyboard 710 and a mouse 720. The base (unit) 20 may attach to any side of the display (shown here on bottom edge of display, allowing for display angle, height, and rotation adjustments by the user without the need for recalibration of the camera system. The camera 10 may be placed on the display in any location by the end user (magnetic). The base may use ultrasound to triangulate the location of the camera, the software may automatically launch and aligns the desired video collaboration application 700.

Figure 8A:
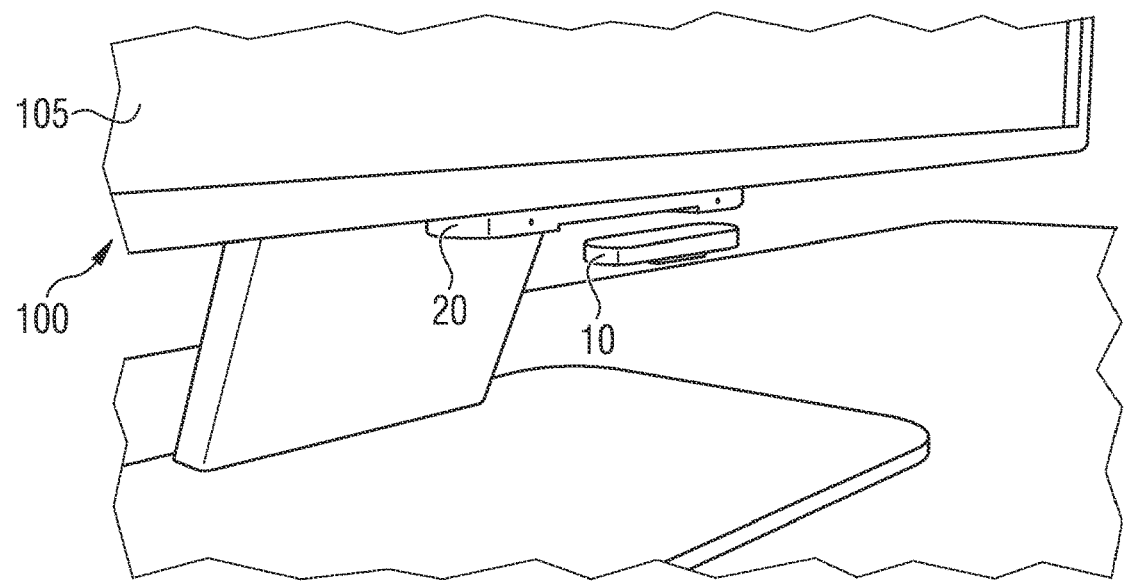
FIG. 8a shows a schematic diagram of a base being attached to a monitor.
Figure 8B:
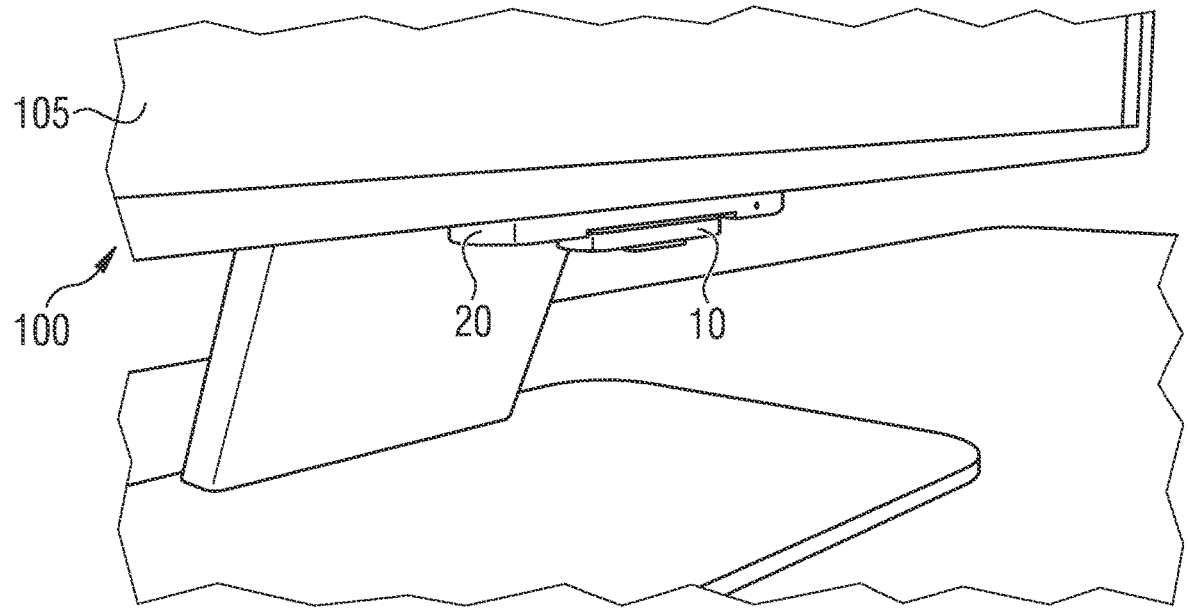
FIG. 8b shows a schematic diagram of a camera being docked into the base with the lens pointing downward for privacy concerns.
Figure 8C:
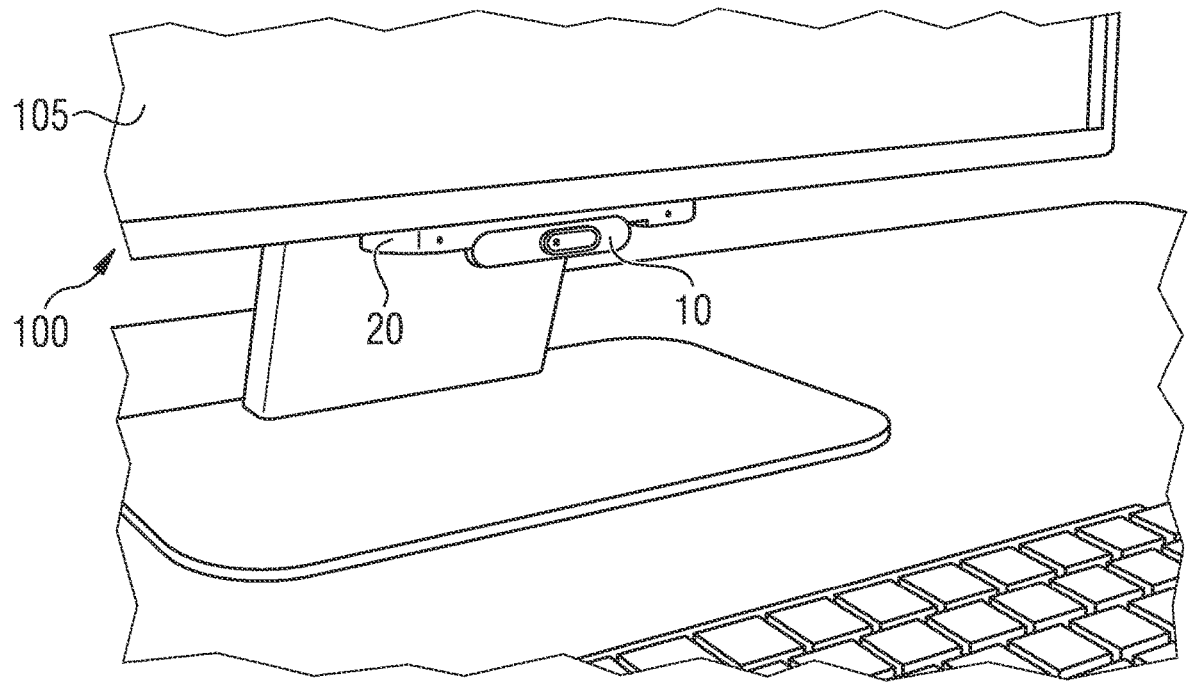
FIG. 8c shows a schematic diagram of a camera being docked into the base with the lens facing towards the user.

FIG. 8a shows a schematic diagram of a base 10 being attached to a monitor 100 (with a display surface 105). The base 20 may be attached to any side of the monitor. The wireless camera unit 10 may dock onto the base for charging. FIG. 8b shows a schematic diagram of a camera being docked into the base with the lens pointing downward for privacy concerns. FIG. 8c shows a schematic diagram of a camera being docked into the base with the lens facing towards the user. As shown in FIG. 8c, the camera can also be docked into the base facing the user to support other features such as user presence detection, user recognition for login, and other features requiring use of a sensor for user detection.

Figure 9C:
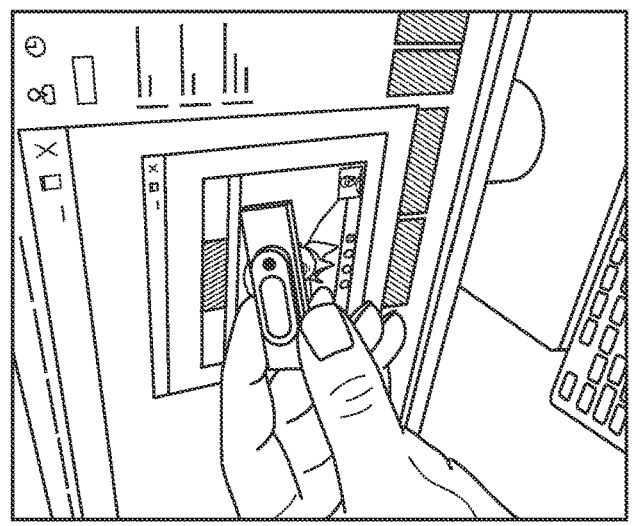
FIGS. 9a to 9c show a schematic diagram of a setup process for a wireless camera unit.
Figure 9B:
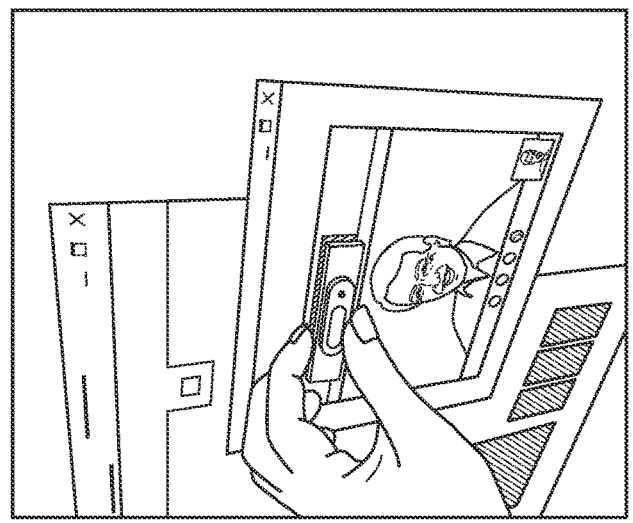
Figure 9A:
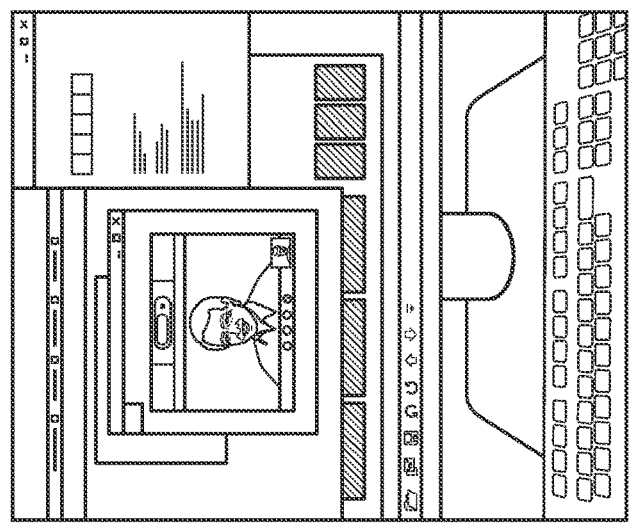

FIGS. 9a to 9c show a schematic diagram of a setup process for a wireless camera unit. FIGS. 9a to 9c show mockup of a setup process. In FIG. 9a it is shown, how the wireless/WiFi camera allows for optical user placement on most displays. A personalized placement may be chosen to match user's ergonomic height. An easy adjustment to individual user's workflow layout may be provided. In FIG. 9b it is shown, how the wireless camera unit is simply magnetically attached to any location on the display. The wireless camera unit may be aligned to an application, or the application (app) may auto-align to the camera. In FIG. 9c, a natural eye level user experience is shown, which enables more natural and comfortable eye contact for video collaboration. Examples are particularly suited for larger displays as well as portrait-orientation displays.

The ultrasound triangulation and trilateration may be implemented similar to an ultrasound triangulation and trilateration positioning as introduced by B Kreczmer in "Fast Triangulation Method for An Ultrasonic Sonar System". Also, some pens for interactive whiteboards use pens with an ultrasound emitter, with a microphone array in a base to determine location. In some examples, the ultrasound triangulation or trilateration may be combined with infrared, e.g. to increase the precision. Ultrasonic pulses may be timed as transmitted from the device to be tracked, e.g. the camera device, and received at two ultrasonic microphones on the base. Infrared may be used to extend the range (e.g. for large monitors). Some examples may also use line of sight positioning from the base. A stationary camera may be added the base that can see the location of the wireless camera when placed on the display, the position of the camera may be added based on image data of said camera, and the application may be aligned accordingly.

Figure 10A:
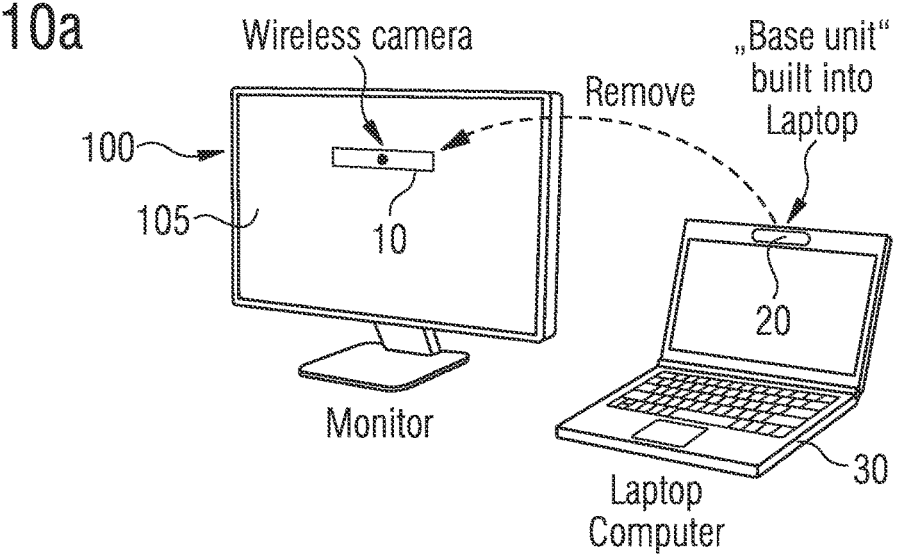
FIGS. 10a to 10c show schematic diagrams of computation devices.
Figure 10B:
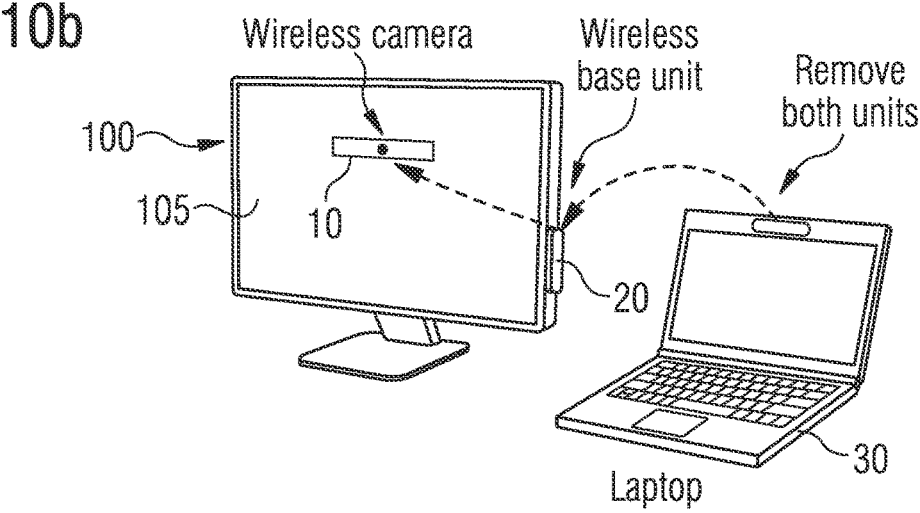
Figure 10C:
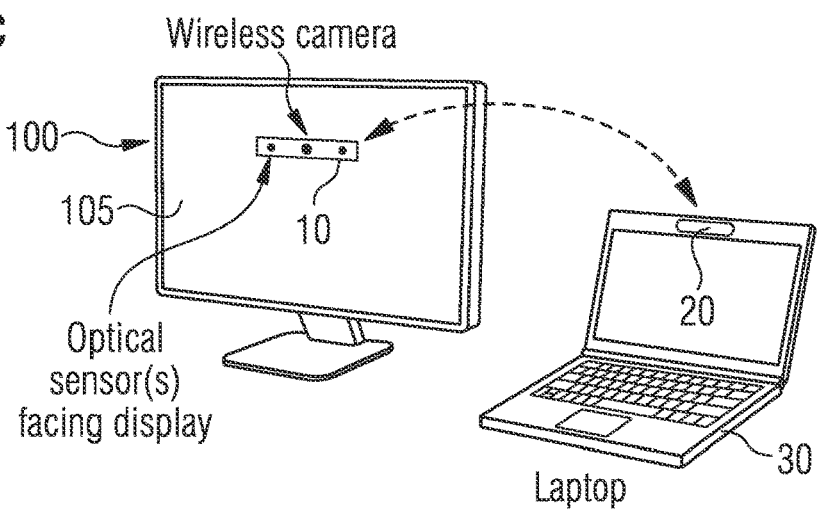

As shown in the following, in some examples, the base unit may be integrated in, or likewise attached to, a laptop computer, such that the camera can either be used in the frame of the laptop computer for portable use, and detached and placed on the external monitor for desktop use. FIGS. 10a to 10c show schematic diagrams of such computation devices.

In FIG. 10a, the wireless camera 10 is shown attached to the display surface 105 of the monitor. The wireless camera may be removed from a base unit 20 that is built into the laptop computer 30, e.g. into the frame of the monitor of the laptop.

In FIG. 10b, the wireless base unit 20 itself is removable from the laptop computer, and can be placed on the frame of the monitor 100.

In FIG. 10c, a concept is shown which requires no ultrasound-based triangulation by the base unit 20. Instead, one or more optical sensors facing the display are included in the wireless camera device 10. The one or more optical sensors may be used to read pixels of the display surface, and to determine the position of the wireless camera based on the pixels read by the one or more optical sensors.

The aspects and features described in relation to a particular one of the previous examples may also be combined with one or more of the further examples to replace an identical or similar feature of that further example or to additionally introduce the features into the further example.

Example 1 relates to a camera device (10) comprising a magnetic attachment mechanism (11) for attaching the camera device to a display surface (105) of a monitor (100). The camera device (10) comprises a camera sensor (12) for generating image data. The camera device (10) comprises wireless communication circuitry (13) for providing the image data wirelessly to a computation device.

In Example 2, the subject matter of example 1 or any of the Examples described herein may further include, that the camera device comprises an ultrasound emitter (14) configured to emit ultrasound signals at least towards a base unit for the camera device.

In Example 3, the subject matter of example 2 or any of the Examples described herein may further include, that g control circuitry (15) configured to detect an attachment of the camera device to the display surface of the monitor, the control circuitry being configured to control the ultrasound emitter to emit the ultrasound signals in response to the detection of the attachment.

In Example 4, the subject matter of example 3 or any of the Examples described herein may further include, that the control circuitry is configured to detect the attachment using an accelerometer (16) of the camera device.

In Example 5, the subject matter of one of the examples 1 to 4 or any of the Examples described herein may further include, that the camera device comprises a battery (17) and a charging mechanism (18) for charging the camera device when the camera device is placed on a corresponding base unit (20).

In Example 6, the subject matter of one of the examples 1 to 5 or any of the Examples described herein may further include, that a shape of the camera device is form-fit to a shape of a corresponding base unit for the camera device.

In Example 7, the subject matter of one of the examples 1 to 6 or any of the Examples described herein may further include, that the camera device is a wireless webcam.

In Example 8, the subject matter of one of the examples 1 to 7 or any of the Examples described herein may further include, that the camera device comprises control circuitry (15), the control circuitry being configured to provide the image data wirelessly to the computation device via the wireless communication circuitry.

In Example 9, the subject matter of example 8 or any of the Examples described herein may further include, that the control circuitry (15) is configured to provide the image data to the computation device via a base unit of the camera device.

In Example 10, the subject matter of one of the examples 8 to 9 or any of the Examples described herein may further include, that the camera device comprises a further camera sensor for generating further image data of the display surface, wherein the control circuitry is configured to determine information on a position of the camera device relative to the display surface based on the further image data, and to provide the information on the position of the camera device to the computation device.

Example 11 relates to a base unit (20) for a camera device (10), the base unit comprising a structural component (21) for removably holding the camera device. The base unit (20) comprises a charging mechanism (22) for charging the camera device when the camera device is held by the structural component. The base unit (20) comprises wireless communication circuitry (23) for wirelessly communicating with the camera device. The base unit (20) comprises control circuitry (24) configured to receive image data from the camera device via the wireless communication circuitry, and to provide the image data to a computation device (30) via interface circuitry of the base unit.

In Example 12, the subject matter of example 11 or any of the Examples described herein may further include, that the base unit comprises two or more ultrasound sensors (25) for receiving ultrasound signals from the camera device, wherein the control circuitry configured to determine a position of the camera device relative to the base unit based on the received ultrasound signals, and to provide information on the position of the camera device to the computation device via the interface circuitry.

In Example 13, the subject matter of example 12 or any of the Examples described herein may further include, that the base unit is arranged at a known position relative to a display surface (105) of a monitor (100), wherein the control circuitry is configured to determine the position of the camera device relative to the display surface of the monitor.

In Example 14, the subject matter of one of the examples 12 to 13 or any of the Examples described herein may further include, that the two or more ultrasound sensors are two or more microphones, wherein the control circuitry is configured to provide a sound recording recorded via the two or more microphones to the computation device via the interface circuitry.

In Example 15, the subject matter of one of the examples 11 to 14 or any of the Examples described herein may further include, that the base unit comprises an attachment mechanism (26) for attaching the base unit to a frame of a monitor.

In Example 16, the subject matter of one of the examples 11 to 15 or any of the Examples described herein may further include, that the computation device is a laptop computer, wherein the base unit is integrated within a frame of a monitor of the laptop computer.

In Example 17, the subject matter of one of the examples 11 to 16 or any of the Examples described herein may further include, that the structural component is form-fit for holding the camera device.

Example 18 relates to a computation device (30) comprising interface circuitry (31) for communicating with a base unit (30) for a camera device (20) or with the camera device. The computation device (30) comprises one or more processors (32) configured to obtain image data of the camera device, obtain information on a position of the camera device from the camera device or from the base unit, and to determine a position of a window of a video application on a display surface (105) of a monitor (100) based on the information on the position of the camera device, with the video application using the image data of the camera device.

In Example 19, the subject matter of example 18 or any of the Examples described herein may further include, that the one or more processors are configured to obtain the information on the position of the camera device from the base unit, and to obtain the image data of the camera device via the base unit.

In Example 20, the subject matter of example 18 or any of the Examples described herein may further include, that the one or more processors are configured to obtain the information on the position of the camera device and the image data from the camera device.

In Example 21, the subject matter of one of the examples 18 to 20 or any of the Examples described herein may further include, that the one or more processors are configured to control the position and/or a size of the window of the video application based on the information on the position of the camera device.

In Example 22, the subject matter of one of the examples 18 to 21 or any of the Examples described herein may further include, that the base unit is external to the computation device.

In Example 23, the subject matter of one of the examples 18 to 22 or any of the Examples described herein may further include, that the computation device is a laptop computer, wherein the base unit is integrated within a frame (34) of a monitor (33) of the laptop computer.

In Example 24, the subject matter of one of the examples 18 to 23 or any of the Examples described herein may further include, that the monitor the base unit is integrated in is the same monitor the video application is displayed on.

In Example 25, the subject matter of one of the examples 18 to 23 or any of the Examples described herein may further include, that the monitor the base unit is integrated in is different from the monitor the video application is displayed on.

Example 26 relates to a system comprising the camera device according to one of the examples 1 to 10 and the base unit according to one of the examples 11 to 17.

Example 27 relates to a system comprising the camera device according to one of the examples 1 to 10 and the computation device according to one of the examples 18 to 25.

Example 28 relates to a system comprising the camera device according to one of the examples 1 to 10, the base unit according to one of the examples 11 to 17, and the computation device according to one of the examples 18 to 25.

Example 29 relates to a camera device (10) comprising magnetic attachment means (11) for attaching the camera device to a display surface (105) of a monitor (100). The camera device (10) comprises means (12) for generating image data. The camera device (10) comprises means for communicating wirelessly (13) for providing the image data wirelessly to a computation device.

In Example 30, the subject matter of example 29 or any of the Examples described herein may further include, that the camera device comprises means for emitting ultrasound signals (14) configured to emit ultrasound signals at least towards a base unit for the camera device.

In Example 31, the subject matter of example 30 or any of the Examples described herein may further include, that g means for controlling (15) configured to detect an attachment of the camera device to the display surface of the monitor, the control circuitry being configured to control the ultrasound emitter to emit the ultrasound signals in response to the detection of the attachment.

In Example 32, the subject matter of example 31 or any of the Examples described herein may further include, that the control circuitry is configured to detect the attachment using an accelerometer (16) of the camera device.

In Example 33, the subject matter of one of the examples 29 to 32 or any of the Examples described herein may further include, that the camera device comprises means for storing energy (17) and charging means (18) for charging the camera device when the camera device is placed on a corresponding base unit (20).

In Example 34, the subject matter of one of the examples 29 to 33 or any of the Examples described herein may further include, that a shape of the camera device is form-fit to a shape of a corresponding base unit for the camera device.

In Example 35, the subject matter of one of the examples 29 to 34 or any of the Examples described herein may further include, that the camera device is a wireless webcam.

In Example 36, the subject matter of one of the examples 29 to 35 or any of the Examples described herein may further include, that the camera device comprises a further means for generating image data, for generating further image data of the display surface, wherein the means for controlling is configured to determine information on a position of the camera device relative to the display surface based on the further image data, and to provide the information on the position of the camera de-vice to the computation device.

In Example 37, the subject matter of example 36 or any of the Examples described herein may further include, that the means for controlling (15) is configured to provide the image data to the computation device via a base unit of the camera device.

In Example 38, the subject matter of one of the examples 36 to 37 or any of the Examples described herein may further include, that Example 39 relates to a base unit (20) for a camera device (10), the base unit comprising structural means (21) for removably holding the camera device. The base unit (20)

comprises charging means (22) for charging the camera device when the camera device is held by the structural component. The base unit (20) comprises means for communicating wirelessly (23) for wirelessly communicating with the camera device. The base unit (20) comprises means for controlling (24) configured to receive image data from the camera device via the wireless communication circuitry, and to provide the image data to a computation device (30) via means for communicating of the base unit.

In Example 40, the subject matter of example 39 or any of the Examples described herein may further include, that the base unit comprises two or more means for sensing ultrasound (25) for receiving ultrasound signals from the camera device, wherein the means for controlling is configured to determine a position of the camera device relative to the base unit based on the received ultrasound signals, and to provide information on the position of the camera device to the computation device via the means for communicating.

In Example 41, the subject matter of example 40 or any of the Examples described herein may further include, that the base unit is arranged at a known position relative to a display surface (105) of a monitor (100), wherein the means for controlling is configured to determine the position of the camera device relative to the display surface of the monitor.

In Example 42, the subject matter of one of the examples 40 to 41 or any of the Examples described herein may further include, that the two or more means for sensing ultrasound are two or more microphones, wherein the means for controlling is configured to provide a sound recording recorded via the two or more microphones to the computation device via the means for communicating.

In Example 43, the subject matter of one of the examples 39 to 42 or any of the Examples described herein may further include, that the base unit comprises means (26) for attaching the base unit to a frame of a monitor.

In Example 44, the subject matter of one of the examples 39 to 43 or any of the Examples described herein may further include, that the computation device is a laptop computer, wherein the base unit is integrated within a frame of a monitor of the laptop computer.

In Example 45, the subject matter of one of the examples 39 to 44 or any of the Examples described herein may further include, that the means component is form-fit for holding the camera device.

Example 46 relates to a computation device (30) comprising means for communicating (31) with a base unit (30) for a camera device (20) or with the camera device. The computation device (30) comprises means for processing (32) configured to obtain image data of the camera device, obtain information on a position of the camera device from the camera device or from the base unit, and to determine a position of a window of a video application on a display surface (105) of a monitor (100) based on the information on the position of the camera device, the video application using the image data of the camera device.

In Example 47, the subject matter of example 46 or any of the Examples described herein may further include, that the means for processing is configured to obtain the information on the position of the camera device from the base unit, and to obtain the image data of the camera device via the base unit.

In Example 48, the subject matter of example 47 or any of the Examples described herein may further include, that the means for processing is configured to obtain the information on the position of the camera device and the image data from the camera device.

In Example 49, the subject matter of one of the examples 46 to 48 or any of the Examples described herein may further include, that the means for processing is configured to control the position and/or a size of the window of the video application based on the information on the position of the camera device.

In Example 50, the subject matter of one of the examples 46 to 49 or any of the Examples described herein may further include, that the base unit is external to the computation device.

In Example 51, the subject matter of one of the examples 46 to 50 or any of the Examples described herein may further include, that the computation device is a laptop computer, wherein the base unit is integrated within a frame (34) of a monitor (33) of the laptop computer.

In Example 52, the subject matter of one of the examples 46 to 51 or any of the Examples described herein may further include, that the monitor the base unit is integrated in is the same monitor the video application is displayed on.

In Example 53, the subject matter of one of the examples 46 to 51 or any of the Examples described herein may further include, that the monitor the base unit is integrated in is different from the monitor the video application is displayed on.

Example 54 relates to a system comprising the camera device according to one of the examples 29 to 38 and the base unit according to one of the examples 39 to 45.

Example 55 relates to a system comprising the camera device according to one of the examples 29 to 38 and the computation device according to one of the examples 46 to 53.

Example 56 relates to a system comprising the camera device according to one of the examples 29 to 38, the base unit according to one of the examples 46 to 53, and the computation device according to one of the examples 46 to 53.

Example 57 relates to a method for a camera device, the method being performed by the camera device, the method comprising providing (110) a magnetic attachment mechanism for attaching the camera device to a display surface of a monitor. The method comprises generating (120) image data using a camera sensor of the camera device. The method comprises providing (130) the image data wirelessly to a computation device.

In Example 58, the subject matter of example 57 or any of the Examples described herein may further include, that the method comprises emitting (150), from the camera device, ultrasound signals at least towards a base unit for the camera device.

In Example 59, the subject matter of example 58 or any of the Examples described herein may further include, that the method comprises detecting (140) an attachment of the camera device to the display surface of the monitor, and emitting (150) the ultrasound signals in response to the detection of the attachment.

In Example 60, the subject matter of example 59 or any of the Examples described herein may further include, that the attachment is detected using an accelerometer of the camera device.

In Example 61, the subject matter of one of the examples 57 to 60 or any of the Examples described herein may further include, that the method comprises charging (160) the camera device when the camera device is placed on a corresponding base unit.

In Example 62, the subject matter of one of the examples 57 to 61 or any of the Examples described herein may further include, that the image data is wirelessly provided to the computation device via a base unit of the camera device.

In Example 63, the subject matter of one of the examples 57 to 62 or any of the Examples described herein may further include, that the method comprises generating (170) further image data of the display surface, determining (172) information on a position of the camera device relative to the display surface based on the further image data, and providing (174) the information on the position of the camera device to the computation device.

Example 64 relates to a method for a base unit for a camera device, the method being performed by the base unit, the method comprising receiving (210) image data from the camera device via a wireless communication. The method comprises providing (220) the image data to a computation device.

In Example 65, the subject matter of example 64 or any of the Examples described herein may further include, that the method comprises receiving (230) ultrasound signals from the camera device, determining (240) a position of the camera device relative to the base unit based on the received ultrasound signals, and providing (250) information on the position of the camera device to the computation device.

In Example 66, the subject matter of example 65 or any of the Examples described herein may further include, that the base unit is arranged at a known position relative to a display surface of a monitor, wherein the position of the camera device is determined relative to the display surface of the monitor.

In Example 67, the subject matter of one of the examples 65 to 66 or any of the Examples described herein may further include, that the ultrasound signals are received via two or more microphones, the method comprising providing (260) a sound recording recorded via the two or more microphones to the computation device.

Example 68 relates to a method for a computation device, the method comprising obtaining (310) image data of a camera device. The method comprises obtaining (320) information on a position of the camera device from the camera device or from a base unit for the camera device. The method comprises determining (330) a position of a window of a video application on a display surface of a monitor based on the information on the position of the camera device, the video application using the image data of the camera device.

In Example 69, the subject matter of example 68 or any of the Examples described herein may further include, that the image data and the information on the position of the camera device is received from the base unit.

In Example 70, the subject matter of example 69 or any of the Examples described herein may further include, that the image data is received via a base unit that is external to the computation device.

In Example 71, the subject matter of example 69 or any of the Examples described herein may further include, that the image data is received via a base unit that is part of the computation device.

In Example 72, the subject matter of example 68 or any of the Examples described herein may further include, that the image data and the information on the position of the camera device is received from the camera device.

In Example 73, the subject matter of one of the examples 68 to 72 or any of the Examples described herein may further include, that the method comprises controlling (340) the position and/or a size of the window of the video application based on the information on the position of the camera device.

Example 74 relates to a machine-readable storage medium including program code, when executed, to cause a machine to perform the method of one of the examples 68 to 73.

Example 75 relates to a computer program having a program code for performing the method of one of the examples 68 to 73, when the computer program is executed on a computer, a processor, or a programmable hardware component.

Example 76 relates to a machine-readable storage including machine readable instructions, when executed, to implement a method or realize an apparatus as claimed in any pending claim or shown in any example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A camera device comprising:
   a magnetic attachment mechanism for attaching the camera device to a display surface of a monitor;
   a camera sensor for generating image data;
   an ultrasound emitter configured to emit ultrasound signals at least towards a base unit for the camera device;
   wireless communication circuitry for providing the image data wirelessly to a computation device, and
   control circuitry configured to detect an attachment of the camera device to the display surface of the monitor, the control circuitry being configured to control the ultrasound emitter to emit the ultrasound signals in response to the detection of the attachment.

2. The camera device according to claim 1, wherein the control circuitry is configured to detect the attachment using an accelerometer of the camera device.

3. The camera device according to claim 1, comprising a battery and a charging mechanism for charging the camera device when the camera device is placed on a corresponding base unit.

4. The camera device according to claim 1, wherein a shape of the camera device is form-fit to a shape of a corresponding base unit for the camera device.

5. The camera device according to claim 1, wherein the camera device is a wireless webcam.

6. The camera device according to claim 1, comprising control circuitry, the control circuitry being configured to provide the image data wirelessly to the computation device via the wireless communication circuitry.

7. The camera device according to claim 6, wherein the control circuitry is configured to provide the image data to the computation device via a base unit of the camera device.

8. A base unit for a camera device, the base unit comprising:
   a structural component for removably holding the camera device;
   a charging mechanism for charging the camera device when the camera device is held by the structural component;
   two or more ultrasound sensors for receiving ultrasound signals from the camera device;
   wireless communication circuitry for wirelessly communicating with the camera device; and
   control circuitry configured to receive image data from the camera device via the wireless communication circuitry, and to provide the image data to a computation device via interface circuitry of the base unit,
      wherein the control circuitry is further configured to determine a position of the camera device relative to the base unit based on the received ultrasound signals, and to provide information on the position of the camera device to the computation device via the interface circuitry.

9. The base unit according to claim 8, wherein the base unit is arranged at a known position relative to a display surface of a monitor, wherein the control circuitry is configured to determine the position of the camera device relative to the display surface of the monitor.

10. The base unit according to claim 8, wherein the two or more ultrasound sensors are two or more microphones, wherein the control circuitry is configured to provide a sound recording recorded via the two or more microphones to the computation device via the interface circuitry.

11. The base unit according to claim 8, comprising an attachment mechanism for attaching the base unit to a frame of a monitor.

12. The base unit according to claim 8, wherein the computation device is a laptop computer, wherein the base unit is integrated within a frame of a monitor of the laptop computer.

13. The base unit according to claim 8, wherein the structural component is form-fit for holding the camera device.

* * * * *